*(12)* United States Patent
Hibberd

(10) Patent No.: US 6,554,238 B1
(45) Date of Patent: Apr. 29, 2003

(54) SUPPORT ARM FOR VISUAL DISPLAY UNIT

(75) Inventor: Ronald Charles Hibberd, Grays Point (AU)

(73) Assignee: Claiteal Pty. Limited, Kingsgrove (AU)

( * ) Notice: Subject to any disclaimer, the term of this patent is extended or adjusted under 35 U.S.C. 154(b) by 0 days.

(21) Appl. No.: 10/111,435

(22) PCT Filed: Nov. 10, 2000

(86) PCT No.: PCT/AU00/01388

§ 371 (c)(1),
(2), (4) Date: Apr. 23, 2002

(87) PCT Pub. No.: WO01/35796

PCT Pub. Date: May 25, 2001

(30) Foreign Application Priority Data

Nov. 18, 1999 (AU) ............................................ PQ 4126
Aug. 2, 2000 (AU) ............................................ PQ 9129

(51) Int. Cl.[7] .................................................. E04G 3/00
(52) U.S. Cl. .................................... 248/278.1; 248/921
(58) Field of Search ......................... 248/278.1, 280.11, 248/288.31, 288.51, 918, 919, 920, 921, 922, 923, 924

(56) References Cited

U.S. PATENT DOCUMENTS 4,768,744 A * 9/1988 Leeds et al. ............ 248/280.11
4,836,486 A * 6/1989 Vossoughi et al. ...... 248/280.11
5,505,424 A    4/1996 Niemann
5,709,360 A    1/1998 Rosen
5,751,548 A    5/1998 Hall et al.
6,019,332 A    2/2000 Sweere et al.
6,138,970 A * 10/2000 Sohrt et al. .............. 248/278.1
RE36,978 E  * 12/2000 Moscovitch ............. 248/122.1
6,189,842 B1 * 2/2001 Gull et al. ................ 248/125.1

FOREIGN PATENT DOCUMENTS

EP       0723368 A2    7/1996
WO       WO97/46824 A1 12/1997

* cited by examiner

*Primary Examiner*—Ramon O. Ramirez
(74) *Attorney, Agent, or Firm*—Edwin D. Schindler

(57) ABSTRACT

A mounting arrangement for a planar visual display unit includes a support base, which can be fixed to a support surface, spacer tubes for elevating a pivotable base above the support surface and an arm fixed to the base through a hinge pin and an air spring. The arm supports a shaped channel plate for holding the visual display unit when the visual display unit is attached to a complementary mounting bracket. The pivot base can rotate 360° with respect to the support base and the arm can move in a vertical plane limited by the action of an air spring. The shaped channel plate is attached to the arm by a pin pivot and a ball and socket joint. The arm and the visual display unit maintain a steady position by way of the dampening of the air spring and the frictional loading applied to each of the joint components, namely the hinge pin, and the pin pivot and ball and socket joint attaching the plate to the arm.

17 Claims, 6 Drawing Sheets

SUPPORT ARM FOR VISUAL DISPLAY UNIT

FIELD OF THE INVENTION

The present invention relates to a support arm for a visual display unit and in particular to a support arm for a flat video screen such as a LCD or plasma display screen.

BACKGROUND ART

In the prior art most visual display units (VDUs) are of the vacuum tube type although of recent times liquid crystal displays or plasma displays are becoming more prevalent. The latter screens are flat and are essentially planar devices compared with a vacuum tube display unit which is both heavy and of considerable depth. To mount VDUs on a support column or with a cantilever or articulated arm it is necessary to compensate for the weight of the visual display unit being supported as well as for any couple or moment which is created. As the arm is moved to suit the viewing of the VDU in a working or commercial environment, these parameters change and problems arise in maintaining a stable position for the arm.

SUMMARY OF THE INVENTION

The present invention seeks to overcome problems or disadvantages in the prior art or to ameliorate them or to provide an alternative thereto.

According to the invention there is provided an apparatus for supporting a visual display unit including a support base, at least one pivot base rotatable with respect to said support base, an arm fixed to and pivotable with respect to said pivot base having means for dampening the motion of said arm and at a free end of said arm a mounting means for mounting a visual display device, said mounting means being pivotable with respect to said arm.

Preferably, the pivot base can be rotated through 360° with respect to said support base while said monitor arm can be raised or lowered through 110° in a vertical plane and said mounting means allows the visual display device fixed thereto to be rotated through 180° in the plane of the arm, plus or minus 40° in any other direction, and 360° about the longitudinal axis or roll axis of the arm. More than one monitor arm can be attached to the base and the height of the base can be adjusted to suit a given application. The monitor can be rotated 360° about the longitudinal axis or roll axis of the arm, for example to change from landscape to portrait position.

The arm is preferably supported by a gas spring and fixed to the pivot base by a pivot pin e.g. a nut and bolt arrangement. This support and fixing arrangement is damped to allow the arm to be maintained in equilibrium with movement of the arm.

Preferably, the planar display unit is readily removable from the support arm, including the disconnection of any electrical attachments, by providing ready access thereto.

Preferably, the support base may be secured to a support surface for stability.

BRIEF DESCRIPTION OF THE DRAWINGS

Preferred embodiments of the invention will now be described with respect to the following figures in which.

PREFERRED MODES FOR PERFORMING THE INVENTION

Figure 1:
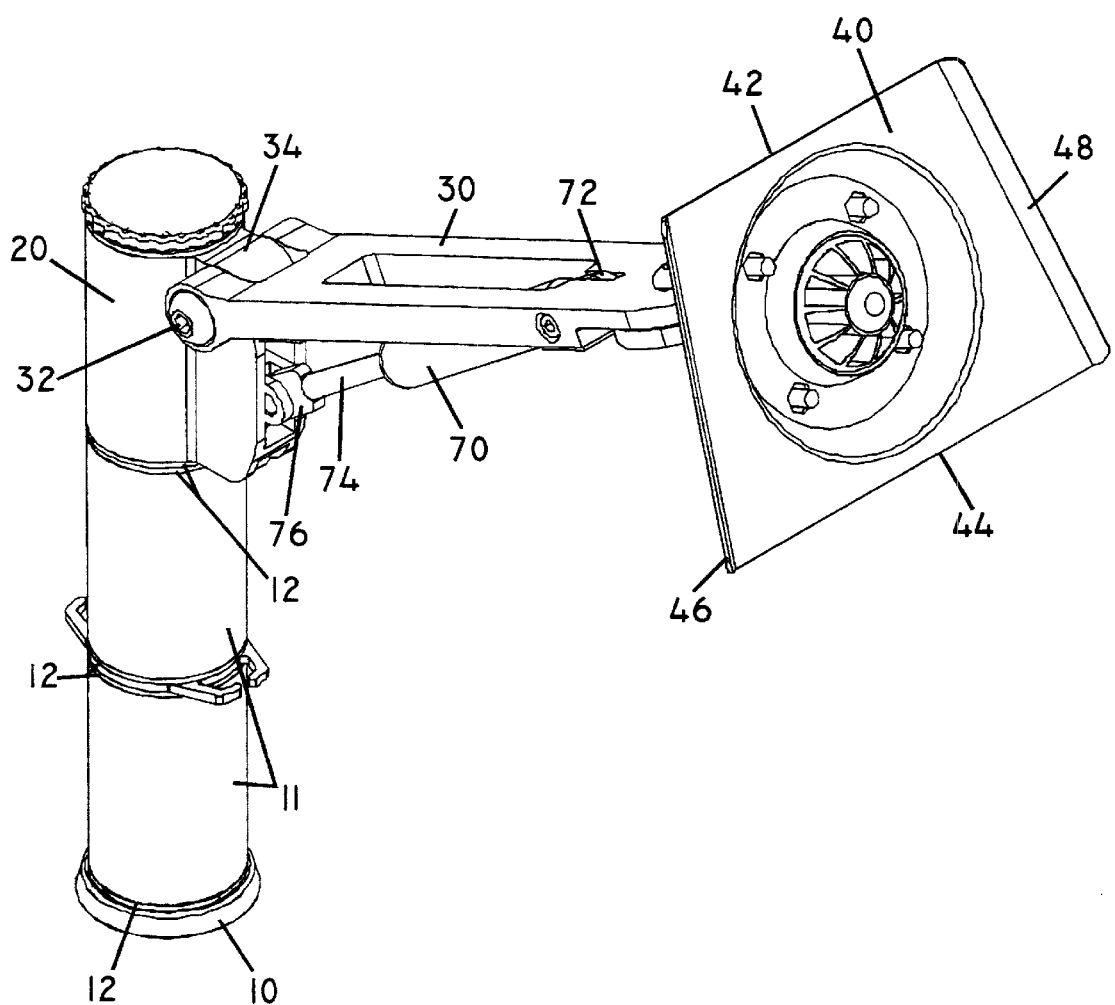
FIG. 1 shows in perspective view a first embodiment of a monitor arm according to the invention.

Referring to FIG. 1 the monitor arm support arrangement includes a support base 10, spacer tubes 11 with a pivot base 20 supported thereon, the pivot base 20 being rotatable through 360° with respect to the support base 10 by means of a bearing 12. An arm 30 is fixed by a pivot 32 to the post 34 extending from the pivot base 20. At the other end of the arm (see FIG. 2) is attached a mounting plate 40 having open ends 42, 44 and channelled sides 46, 48. The open end 44 is wider than the open end 42 creating a divergent channel between the sides 46, 48. The support base 10 may include means whereby it can be fixed, for example, removably, to a support surface (not shown) such as a desk, wall, floor, ceiling for stability, the fixing means being within the knowledge of a person skilled in the art.

The mounting plate 40 is attached to the arm 30 through two pivoting mechanisms, a swivel head 50 and a ball pivot 60. The swivel head 50 is fixed to the arm 30 by a pin pivot, for example nut and bolt, 52. The swivel head 50 is a flange having a stepped head 54 cut to allow the head 50 to rotate about the stepped end 56 of the arm 30. The swivel head 50 can rotate through at least 180° in the plane of the monitor arm 30.

Attached to the stepped portion 54 of the swivel head 50 is a ball pivot 60 having a ball part 62 and a socket part 64 of a ball and socket joint. The socket 64 on the swivel head 50 mates with the ball 62 at the back 66 of the plate 40. The ball pivot 60 allows rotations of the plate 40 through the permitted angle of the ball pivot 60. Preferably, rotation through plus or minus 40° in pitch and/or yaw is provided for the mounting plate 40 with respect to the longitudinal or roll axis of the swivel head 50.

In addition to the bolt 32, the arm 30 is supported by a gas spring 70 fixed at one end 72 to the arm 30 and fixed at the other end 74 of the gas spring 70 to the post 34 near the join of the pivot base 20 to the spacer 11. The arm 30 is partially hollowed to accommodate the gas spring 70 and to reduce the weight of the arm. The other end 74 of the gas spring 70 is supported by a pivoting attachment 76 to accommodate movement of the arm 30 in a vertical plane through the arm 30. The pivoting attachment 76 can move vertically to adjust the angle, and hence the weight bearing characteristics, of the gas spring 70.

The gas spring 70 provides for damped movement of the arm 30. In addition, the friction provided by the bolt 32 and the bolt 52 provides respectively resistance to the motion of the arm 30 and the swivel head 50. The combination of these two factors allows the position of the plate 40 loaded by a panel display unit attached thereto to remain stationary or stable for any given position to which the arm 30 is moved.

Figure 3:
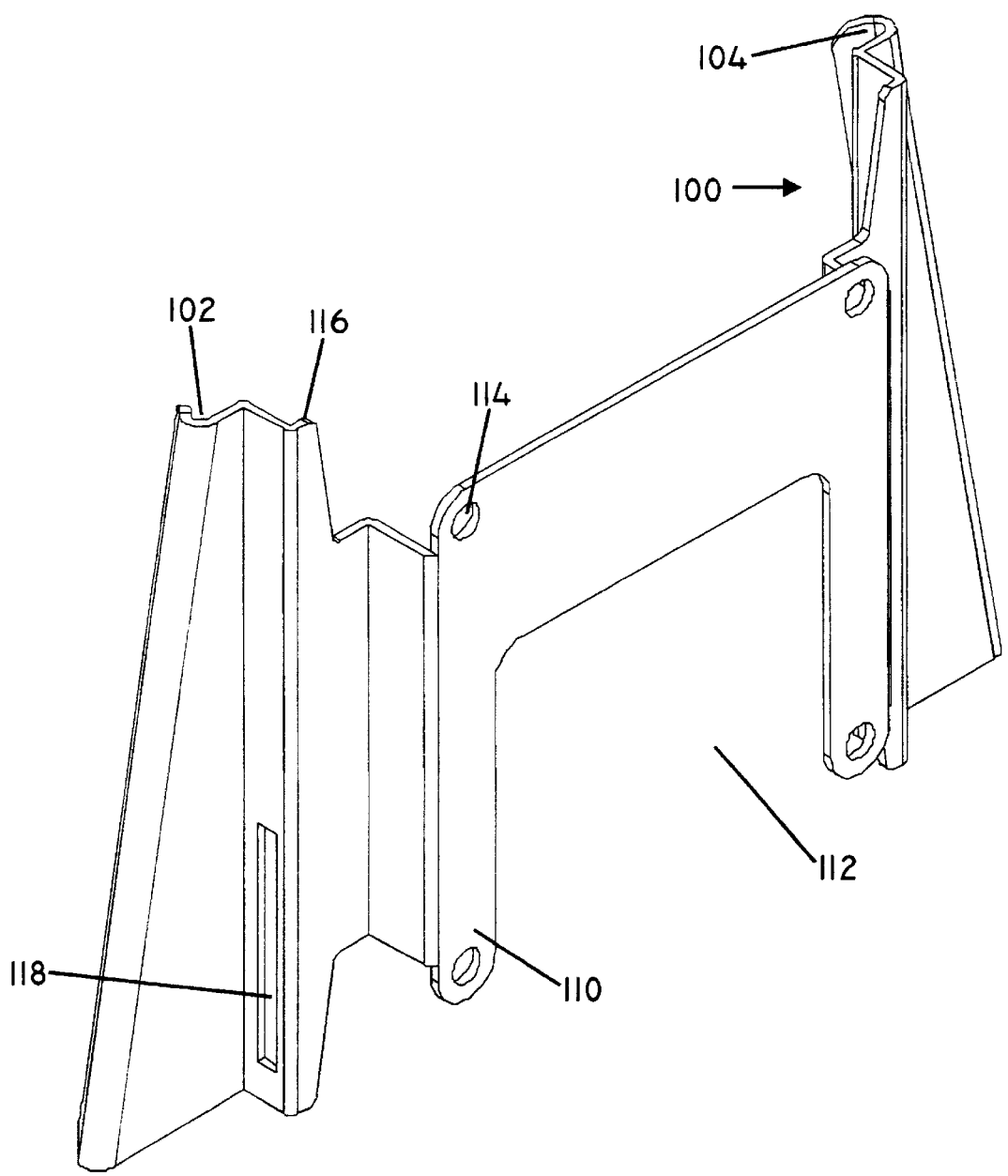
FIG. 3 shows in perspective, a view of a bracket for use with the monitor arm of FIG. 1.
Figure 4:
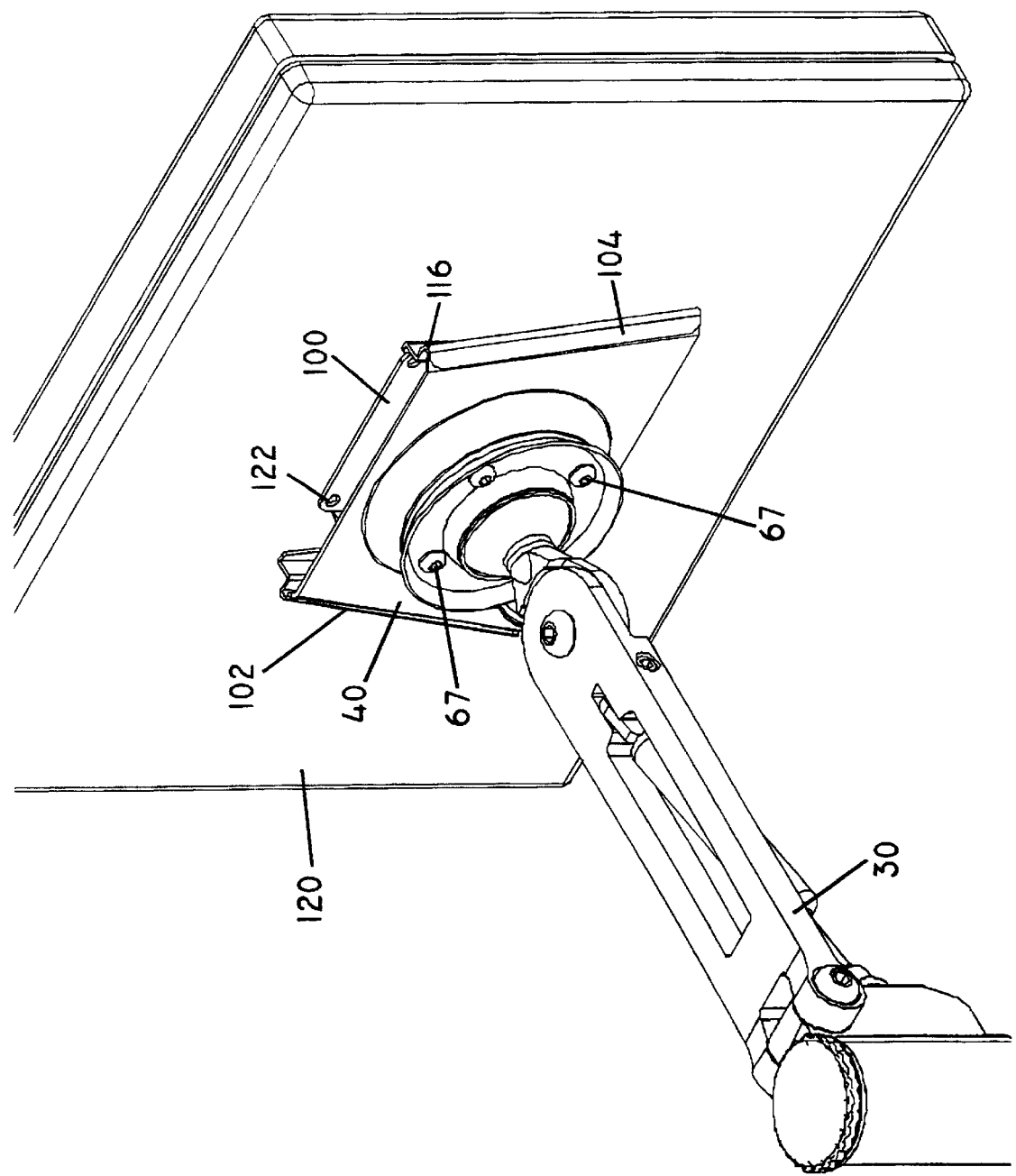
FIG. 4 shows the monitor arm supporting a planar monitor or visual display unit.

Referring to FIGS. 3 and 4, a bracket 100 is shown allowing quick attaching and detaching of a planar monitor to the arm. A back plate 110 attaches the bracket 100 to a monitor 120 (see FIG. 4) by fixtures 122 through holes 114. The bracket 100 has channels 102, 104 for sliding engagement on sides 46, 48 of mounting plate 40 with the separation of the channels 102, 104 matching the divergence of the sides 46, 48 (see FIG. 4).

The back plate 110 is spaced from the channels 102, 104 by stepped portion 116 to provide clearance for accommodating cabling between the mounting plate 40 and the monitor 120. In addition, the back plate 110 has cut-out 112 for allowing access to attach or detach the plugs of a monitor 120 once on the bracket 100.

A lock 130 can be provided in the plate 40 to provide security for the monitor or planar visual display unit 120. The lock 130 has a tongue (not shown) which, when rotated to its locking position, engages in the slot 118 holding the mounting plate 40 and bracket 100 together.

The components of the bracket 100 and the monitor arm such as the support base 10, spacers 11, the pivot base 20, the arm 30, or the plate 40 can be made of any suitable material such as metal or plastics material, within the knowledge of a person skilled in the art. The bearing components 12 such as between spacer 11 and the pivot base 20 can be made of nylon and the components of the ball pivot 60 between the swivel head 50 and the plate 40 can be made of materials within the knowledge of a person skilled in the art.

Figure 2:
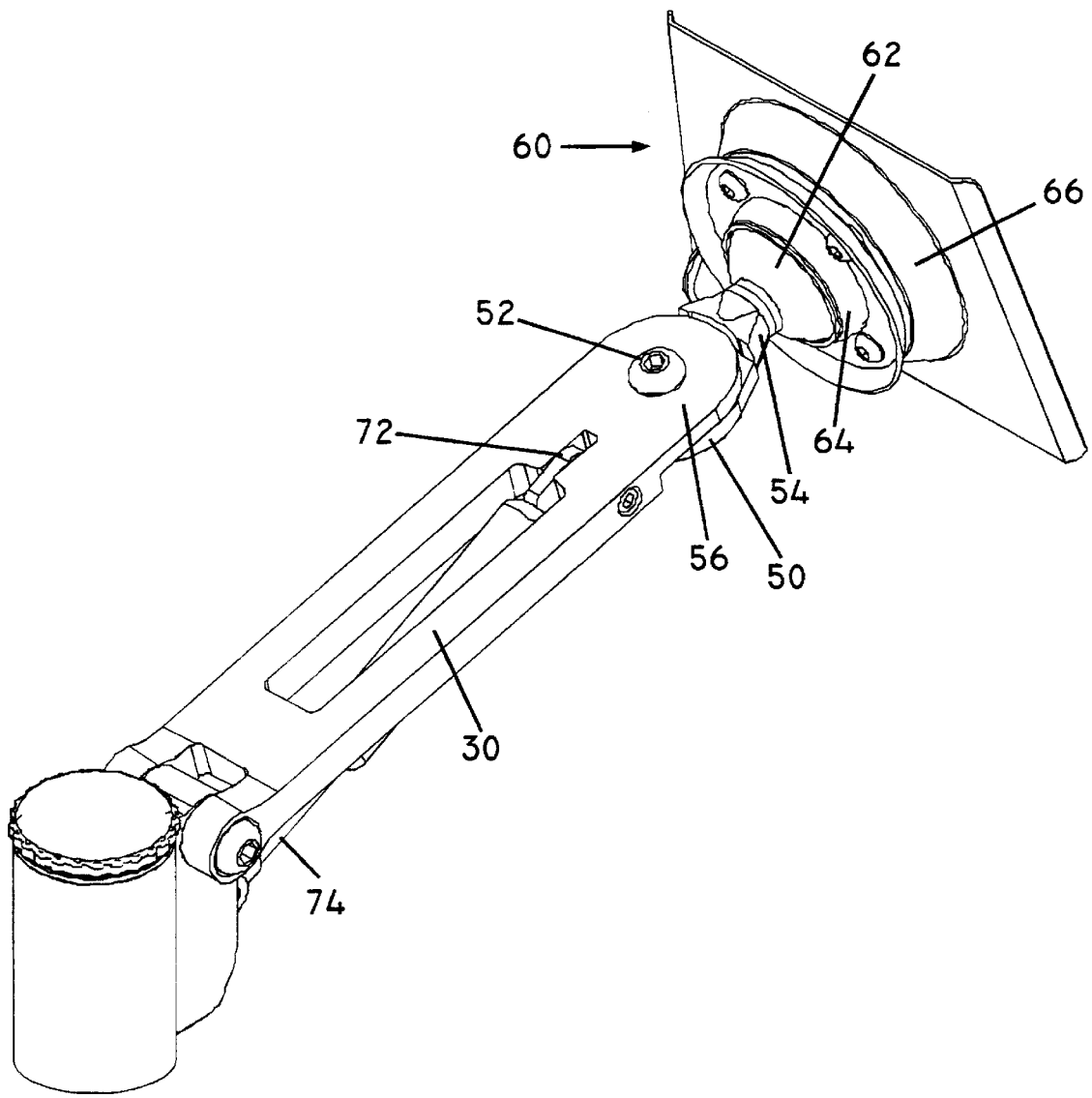
FIG. 2 shows a rear view of the mounting mechanism of FIG. 1.

The ball and socket joint as shown in FIGS. 2 and 4 is secured to the mounting plate 40 in any manner well known in the art, for example by fixtures 67, to the back 66 of the plate 40. An alternative arrangement is shown in FIG. 5.

Figure 5:
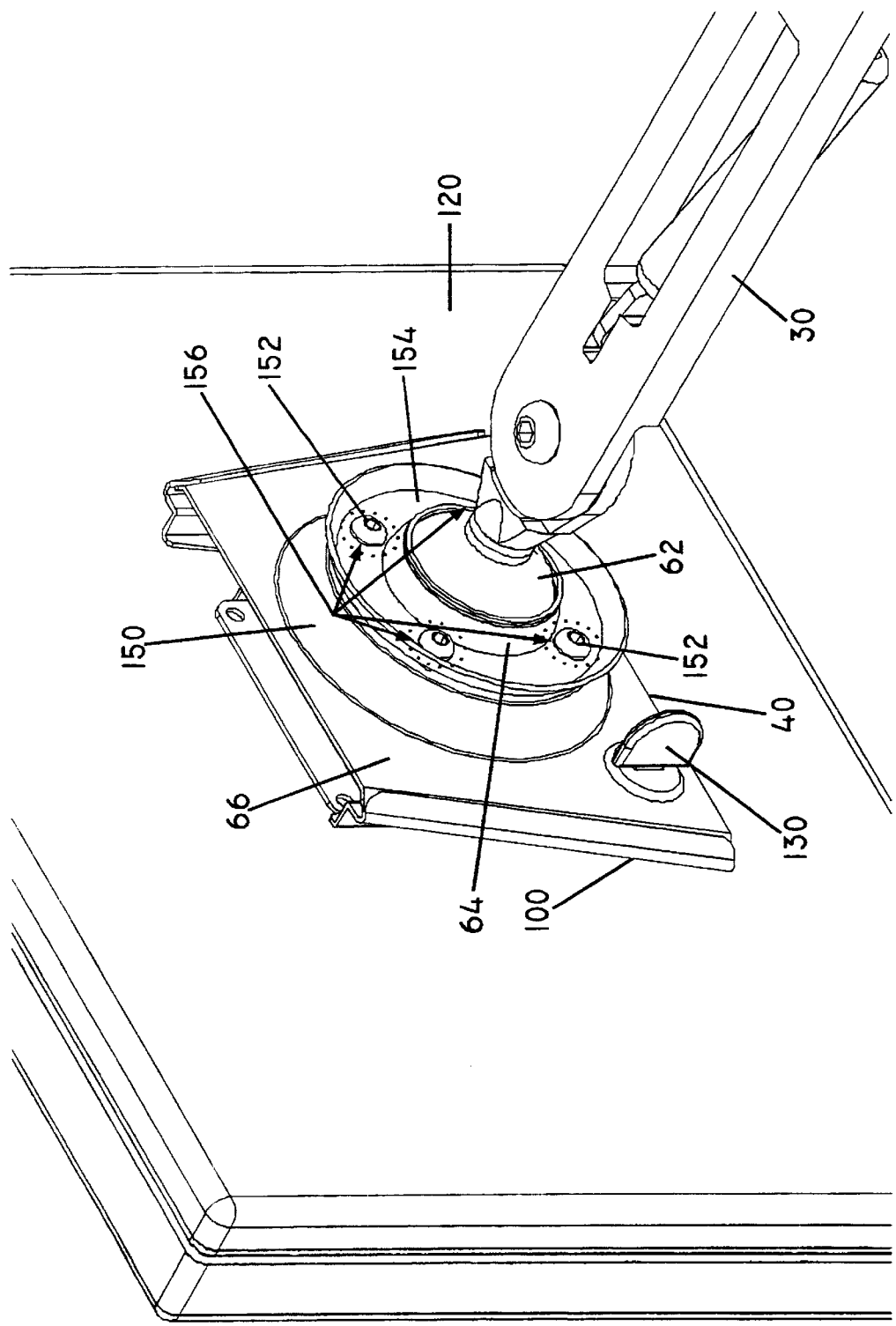
FIG. 5 shows an alternative arrangement for fixing the swivel head to the mounting plate for the mounting mechanism according to the invention.

As shown in FIG. 5, the back 66 of mounting plate 40 has a truncated conical fixture 150 to which the socket part 64 of the ball and socket joint or ball pivot 60 is attached. In the embodiment as shown in FIG. 5, adjustable fixtures 152 are located about the periphery 154 of socket part 64 and secure the socket part 64 to the fixture 150. Springs or similar resilient elements 156 are positioned about each fixture 152 between socket part 64 and conical fixture 150. Fixtures 152 may be screws or bolts, for example. Tightening or slackening of fixtures 152 against the restoring force of springs 156 allows adjustment of the pressure applied between the ball and socket components 62, 64 of the ball pivot 60 and thus of its frictional loading. Springs 156 also allow the pivot 60 to flex about directions within the plane of the plate 40 or of the planar VDU 120. This arrangement allows dampening of the motion of the pivot 60 and of the VDU held by the plate 40.

Springs 156 may be coiled springs or may be leaf springs. Other forms of resilient means are contemplated within the knowledge of a person skilled in the art.

Figure 6:
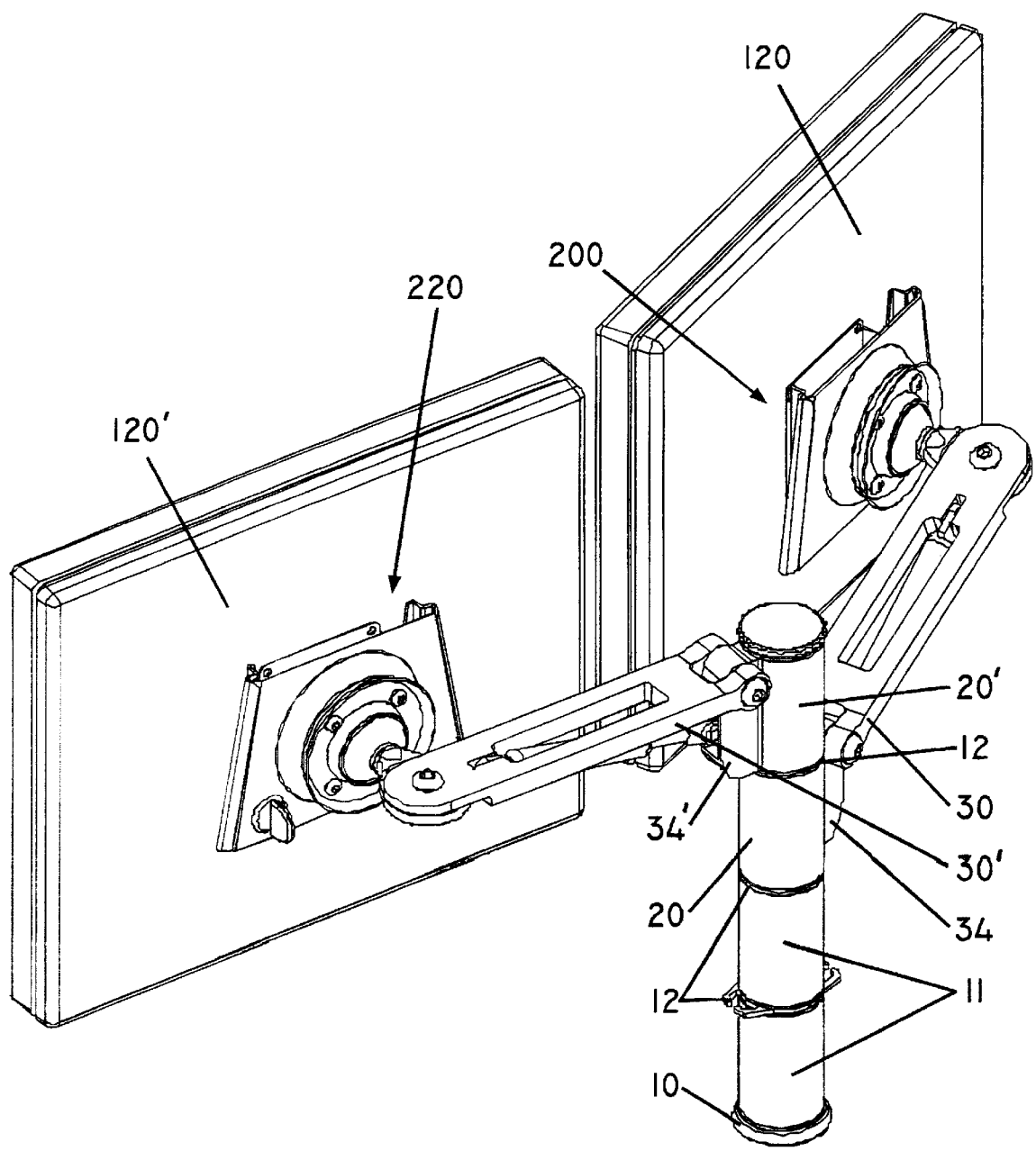
FIG. 6 shows a further embodiment of the invention illustrating two monitor arms being supported by the support base.

More than one support arm 30 can be supported by the support base 10. FIG. 6, for example, shows the situation where two support arms 30, 30' are provided, each attached to their respective pivot base 20, 20', including posts 34, 34', and supporting respective VDU 120, 120'. Each of the features of the two supporting arrangements 200, 220 is substantially identical to those of the embodiments described above with respect to FIGS. 1–5. Each arm 30, 30' may support a VDU the same as the other or of a different size, weight or construction. The VDUs may face the same direction (as shown) or a different direction as required. The spacer means 11 may be used to space the pivot bases 20, 20' from the support base 12 or may be used to space the pivot bases 20, 20' apart.

Although the invention has been described above with respect to preferred embodiments thereof variations therein are contemplated within the knowledge of a person skilled in the art. For example, in place of the gas spring 70 an oil filled hydraulic cylinder or a metal coil spring may be employed.

What is claimed is:

1. An apparatus for supporting a visual display unit including a support base, means to fix said support base to a support surface, at least one pivot base, each said pivot base being spaced from said support base and supported on bearing means allowing each of said pivot bases to be freely rotatable through 360° with respect to said support base, or each of said pivot bases, an arm fixed at one end to said pivot base, and pivotable with respect to said pivot base about an horizontal axis, each said arm having means for dampening the motion of said arm and a mounting means at a free end of said arm for mounting a visual display unit, said mounting means including flange means attached by a further pivot means at said free end of said arm, said further pivot means allowing rotation of said flange means about an axis perpendicular to the longitudinal axis of said arm, said flange means supporting at an end thereof distal from said further pivot means a ball and socket joint means to which is attached means for attaching a visual display unit.

2. An apparatus for supporting a visual display unit as claimed in claim 1 wherein said means for attaching is rotatable through 180° about said further pivot means, plus or minus 40° in any other direction and 360° about the longitudinal axis of said arm.

3. An apparatus for supporting a visual display unit as claimed in claim 1 wherein a plurality of monitor arms are attached to said support base via respective pivot bases.

4. An apparatus as claimed in claim 1 wherein said arm can be raised or lowered through 110° in a vertical plane through said arm, said mounting means being rotatable through 180° in the plane of said arm, 360° about the longitudinal axis of said arm and plus or minus 40° in any other direction, wherein said arm is attached to said pivot base by arm pivot means and said arm is supported by a resilient means fixed between said pivot base and said arm, and wherein said resilient means and said arm pivot means further includes said means for dampening the motion of said arm whereby said arm is maintained in equilibrium.

5. An apparatus for supporting a visual display unit as claimed in claim 4 wherein said arm pivot means is a pivot pin and said resilient means is a gas spring.

6. An apparatus for supporting a visual display unit as claimed in claim wherein said means for attaching includes a channel section.

7. An apparatus for supporting a visual display unit as claimed in claim 6 wherein said channel section includes a base portion, and a pair of upstanding non parallel side walls for supporting a mounting bracket to which is affixed said visual display unit.

8. An apparatus for supporting a visual display unit as claimed in claim 7 wherein said mounting bracket includes a back plate which attaches said mounting bracket to said visual display unit, a pair of non parallel channels for sliding engagement with said upstanding non parallel side walls of said channel section, and respective joining portions spacing said channels of said mounting bracket from said back plate.

9. An apparatus for supporting a visual display unit as claimed in claim 8 wherein said means for attaching is rigidly fixed to a component of said ball and socket joint means.

10. An apparatus for supporting a visual display unit as claimed in claim 8 wherein said means for attaching is rigidly fitted to a component of said ball and socket joint means.

11. An apparatus for supporting a visual display unit as claimed in claim 5 wherein said means for attaching is rigidly fixed to a component of said ball and socket joint means.

12. An apparatus for supporting a visual display unit as claimed in claim 5 wherein said means for attaching is resiliently fitted to a component of said ball and socket joint means.

13. An apparatus for supporting a visual display unit as claimed in claim 12 wherein said component is the socket portion of said ball and socket joint means and said means for attaching is resiliently fitted to said socket portion by spring biased adjustable fixtures.

14. An apparatus for supporting a visual display unit as claimed in claim 12 wherein said visual display unit is a planar display screen.

15. An apparatus as claimed in claim 1 for supporting a plurality of visual display units including a plurality of pivot bases, each rotatable with respect to said support base and each having an arm, dampening means and mounting means for supporting respective ones of said plurality of visual display units.

16. An apparatus for supporting a plurality of visual display units as claimed in claim 15 further including spacer means for spacing said pivot base from said support base or from another pivot base.

17. An apparatus for supporting a visual display unit as claimed in claim 1 further including spacer means for spacing said pivot base from said support base or from another said pivot base.

* * * * *